United States Patent
Maltsev et al.

(10) Patent No.: US 8,218,674 B2
(45) Date of Patent: *Jul. 10, 2012

(54) OFDM TRANSMITTER WITH ADAPTIVE BIT INTERLEAVER FOR ADAPTIVE BIT LOADING AND METHOD FOR OFDM COMMUNICATIONS

(75) Inventors: Alexander A. Maltsev, Nizhny Novgorod (RU); Ali S. Sadri, San Diego, CA (US); Alexei V. Davydov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 438 days.

This patent is subject to a terminal disclaimer.

(21) Appl. No.: 12/492,466

(22) Filed: Jun. 26, 2009

(65) Prior Publication Data

US 2009/0257454 A1    Oct. 15, 2009

Related U.S. Application Data

(63) Continuation of application No. 10/740,170, filed on Dec. 18, 2003, now Pat. No. 7,570,695.

(51) Int. Cl.
*H04L 27/36* (2006.01)
(52) U.S. Cl. ........................ 375/295; 375/299
(58) Field of Classification Search .................. 375/142, 375/219, 259–260, 295, 347, 377, 296, 299; 370/478, 535–540, 203, 208, 319, 343, 430; 714/746, 752, 761–762, 786–788
See application file for complete search history.

(56) References Cited

U.S. PATENT DOCUMENTS

| | | | |
|---|---|---|---|
| 5,056,112 A * | 10/1991 | Wei | 375/280 |
| 6,334,197 B1 * | 12/2001 | Eroz et al. | 714/701 |
| 6,456,653 B1 | 9/2002 | Sayeed | |
| 6,546,509 B2 * | 4/2003 | Starr | 714/704 |
| 6,747,948 B1 | 6/2004 | Sarraf et al. | |
| 6,766,489 B1 | 7/2004 | Piret et al. | |
| 6,795,392 B1 | 9/2004 | Li et al. | |

(Continued)

FOREIGN PATENT DOCUMENTS

JP        02-290368        10/2002

(Continued)

OTHER PUBLICATIONS

"U.S. Appl. No. 10/740,170, Non-Final Office Action mailed Oct. 28, 2008", 33 pgs.

(Continued)

*Primary Examiner* — Lawrence B Williams
(74) *Attorney, Agent, or Firm* — Schwegman, Lundberg & Woessner, P.A.; Gregory J. Gorrie

(57) ABSTRACT

A multi-antenna transmitter includes an adaptive bit interleaver for orthogonal frequency division multiplexed (OFDM) communications. The adaptive bit interleaver permutes a variable number of coded bits per OFDM symbol (Ncbps). The variable number of coded bits is calculated based on individual subcarrier modulation assignments for orthogonal subcarriers. The interleaver matrix size may be based on the variable number of coded bits per OFDM symbol and the number of subchannels. The interleaver may add padding bits to the interleaver matrix to fill any remaining positions, and after performing an interleaving operation, the interleaver may prune the padding bits to provide a sequence of interleaved bits for subsequent modulation on the orthogonal subcarriers and transmission by more than one antenna. The transmitter may transmit the OFDM symbol in accordance with an IEEE 802.16 standard.

20 Claims, 4 Drawing Sheets

U.S. PATENT DOCUMENTS

| | | | |
|---|---|---|---|
| 6,925,587 B2* | 8/2005 | Eroz et al. | 714/701 |
| 7,028,230 B2* | 4/2006 | Manninen et al. | 714/702 |
| 7,068,628 B2 | 6/2006 | Li et al. | |
| 7,091,889 B2* | 8/2006 | Kukla et al. | 341/81 |
| 7,154,936 B2 | 12/2006 | Bjerke et al. | |
| 7,200,794 B2* | 4/2007 | Starr | 714/774 |
| 7,269,149 B2* | 9/2007 | Kukla et al. | 370/328 |
| 7,315,577 B2* | 1/2008 | Shao | 375/260 |
| 7,570,695 B2* | 8/2009 | Maltsev et al. | 375/260 |
| 7,693,034 B2* | 4/2010 | Singh et al. | 370/208 |
| 2002/0016938 A1 | 2/2002 | Starr | |
| 2002/0035709 A1* | 3/2002 | Chen et al. | 714/702 |
| 2002/0051501 A1* | 5/2002 | Demjanenko et al. | 375/298 |
| 2002/0102940 A1* | 8/2002 | Bohnke et al. | 455/23 |
| 2003/0012171 A1* | 1/2003 | Schmidl et al. | 370/342 |
| 2003/0103584 A1 | 6/2003 | Bjerke et al. | |
| 2003/0193889 A1* | 10/2003 | Jacobsen | 370/208 |
| 2004/0178954 A1* | 9/2004 | Vook et al. | 342/383 |
| 2005/0135493 A1 | 6/2005 | Maltsev et al. | |

FOREIGN PATENT DOCUMENTS

| | | |
|---|---|---|
| TW | 510103 | 11/2002 |
| TW | 522694 | 3/2003 |
| WO | WO-2005064876 A1 | 7/2005 |

OTHER PUBLICATIONS

"U.S. Appl. No. 10/740,170, Non-Final Office Action mailed May 2, 2008", 44 pgs.

"U.S. Appl. No. 10/740,170, Notice of Allowance mailed Apr. 13, 2009", 12 pgs.

"U.S. Appl. No. 10/740,170, Response filed Jan. 7, 2009 to Non-Final Office Action mailed Oct. 28, 2008", 16 pgs.

"U.S. Appl. No. 10/740,170, Response filed Jul. 22, 2008 to Non-Final Office Action mailed May 2, 2008", 18 pgs.

"Application Serial No. 93137177, Office Action mailed Mar. 23, 2009", 7 Pages.

"International Search Report for corresponding PCT Application No. PCT/US2004/040142", (May 2, 2005), 4 pgs.

"Supplement to IEEE Standard for IT-Telecomm. & Info. Exchange Between Systems—Local and Metropolitan Area Networks—specific requirements. Part 11:Wireless LAN Medium Access Control(MAC)and Physical Layer(PHY)Specs:High-speed Physical Layer in 5GHZ Band", *IEEE STD 802.11a-1999*, (Dec. 30, 1999), 1-90.

"Taiwanese Application No. 93137177 Office Action dated Nov. 2, 2007", 3 pgs.

"Taiwanese Application Serial No. 93137177 Office Action mailed Jul. 1, 2008", 23 pgs.

Bangerter, et al., "high-Throughput Wireless LAN air Interface", *Intel Technology Journal*, vol. 07, Issue 03, (Jun. 19, 2003), pp. 47-57.

Bangerter, B., et al., "High-Throughput Wireless Lan Air Interface", *Intel Technology Journal*, 7, (Aug. 19, 2003), 47-57.

Bangerter, B., et al., "High-Throughput Wireless LAN Air Interface", *Intel Technology Journal*, 7(3), http://developer.intel.com/technology/itj/index.htm, (Aug. 9, 2003), 47-57.

Bangerter, Boyd, et al., "High-Throughput Wireless LAN Air Interface", *Intel Technology Journal: Wireless Technologies,* 7(3), http://developer.intel.com/technology/itj/index.htm, (Aug. 19, 2003), 47-57.

\* cited by examiner

OFDM TRANSMITTER WITH ADAPTIVE BIT INTERLEAVER FOR ADAPTIVE BIT LOADING AND METHOD FOR OFDM COMMUNICATIONS

RELATED APPLICATIONS

This application is a continuation of U.S. patent application Ser. No. 10/740,170, now issued as U.S. Pat. No. 7,570,695, filed on Dec. 18, 2003, which is incorporated herein by reference in its entirety.

TECHNICAL FIELD

Embodiments of the present invention pertain to wireless communications. Some embodiments of the present invention pertain to wireless communications in accordance with the IEEE 802.16 standards. Some embodiments pertain to multi-antenna transmitters. Some embodiments pertain to channel coding and bit interleaving.

BACKGROUND

Many wireless communication systems employ an interleaving scheme to reduce errors in transmission. Interleaving, for example, may help reduce the number of undetected error bursts, especially in channels with memory (i.e., fading channels). Interleaving is generally performed after channel encoding and permutes bits in a regular or predetermined fashion prior to modulation and transmission. Upon reception and after demodulation, a deinterleaving process is performed to restore the original bit sequence. Some orthogonal frequency division multiplexed (OFDM) systems use coding and frequency interleaving to help overcome problems associated with transmitting data over frequency-selective (i.e., fading) channels. Interleaving may exploit this frequency diversity by spreading any locally deep fades within the channel across the transmission bandwidth. Block interleaving is one form of interleaving in which a block of bits is inputted to a matrix in a one fashion (e.g., row-by-row) and outputted from the matrix in another fashion (e.g., column-by-column). Block interleaving uses a fixed number of bits to fill the matrix. It is difficult to perform block interleaving in systems where the number of coded bits is not fixed.

DETAILED DESCRIPTION

The following description and the drawings sufficiently illustrate specific embodiments to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments set forth in the claims encompass all available equivalents of those claims.

Figure 1:
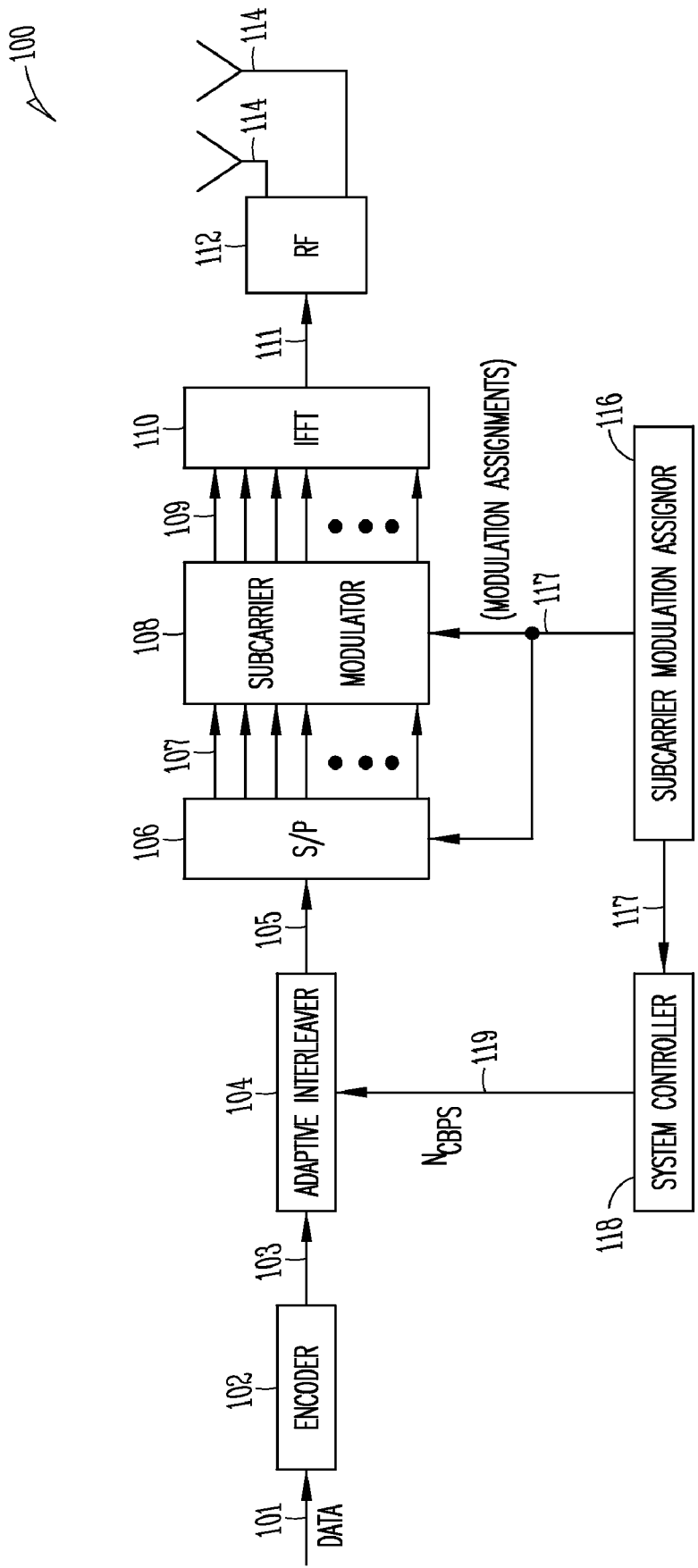
FIG. 1 is a block diagram of a transmitter in accordance with some embodiments of the present invention.

FIG. 1 is a block diagram of a transmitter in accordance with some embodiments of the present invention. Transmitter 100 may be part of a wireless communication device and may transmit orthogonal frequency division multiplexed (OFDM) communication signals. In some embodiments, transmitter 100 may transmit an OFDM symbol on a wideband communication channel. The wideband channel may comprise one or more subchannels. The subchannels may be frequency-division multiplexed (i.e., separated in frequency) and may be within a predetermined frequency spectrum. The subchannels may comprise a plurality of orthogonal subcarriers. In some embodiments, the orthogonal subcarriers of a subchannel may be closely spaced OFDM subcarriers. To achieve orthogonality between the closely spaced subcarriers, the subcarriers of a particular subchannel may have null at substantially a center frequency of the other subcarriers of that subchannel.

In accordance with some embodiments, transmitter 100 may symbol-modulate the subcarriers in accordance with individual subcarrier modulation assignments. This may be referred to as adaptive bit loading (ABL). Accordingly, one or more bits may be represented by a symbol modulated on a subcarrier. The modulation assignments for an individual subchannel may be based on the channel characteristics or channel conditions for that subcarrier, although the scope of the invention is not limited in this respect. In some embodiments, the subcarrier modulation assignments may range from zero bits per symbol to up to ten or more bits per symbol. In terms of modulation levels, the subcarrier modulation assignments may comprise, for example, binary phase shift keying (BPSK), which communicates one bit per symbol, quadrature phase shift keying (QPSK), which communicates two bits per symbol, 8PSK, which communicates three bits per symbol, 16-quadrature amplitude modulation (16-QAM), which communicates four bits per symbol, 32-QAM, which communicates five bits per symbol, 64-QAM, which communicates six bits per symbol, 128-QAM, which communicates seven bits per symbol, and 256-QAM, which communicates eight bits per symbol. Modulation orders with higher communication rates per subcarrier may also be used.

An OFDM symbol may be viewed as the combination or sum of the symbols modulated on the individual subcarriers. Because of the variable number of bits per symbol-modulated subcarrier and the variable number of subchannels that may comprise a wideband channel, the number of bits per OFDM symbol may vary greatly. For example, in some embodiments, a wideband channel may comprise up to four or more subchannels having bandwidths of approximately 20 MHz, and each of the subchannels may have up to 48 or more orthogonal data subcarriers and up to four non-data subcarriers. The subcarriers may have a spacing therebetween of approximately 312.5 kHz. Each subcarrier may have individual subcarrier modulation assignments between zero and ten bits per symbol. In these embodiments, when four subchannels are used with 48 data subcarriers, and the subcarriers are modulated up to 64-QAM (six bits per subcarrier symbol), the number of bits per single OFDM symbol may range up to 1152 bits (4 subchannels per wideband channel× 48 subcarriers per subchannel×6 bits per symbol). In accordance with some embodiments of the present invention, transmitter 100 includes circuitry, described in more detail below, to interleave, subcarrier modulate, and transmit a variable number of bits per OFDM symbol.

In some embodiments, the frequency spectrums for a wideband channel may comprise subchannels in either a 5 GHz frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the inventive subject matter is not limited in this respect, as other frequency spectrums are also equally suitable. This is described in more detail below.

In accordance with some embodiments, transmitter 100 may use a form of block interleaving to reduce the effects of a frequency selective (i.e., fading) channel by spreading these affects across the transmission bandwidth. Conventional block interleaving, however, requires a fixed number of bits to fill an interleaving matrix. The number of bits is conventionally equal to the number of bits of an OFDM symbol. Transmitter 100, however, transmits OFDM symbols having a variable number of coded bits. In accordance with some embodiments, transmitter 100 employs adaptive interleaver 104 to perform a form of block interleaving on OFDM symbols having a variable number of coded bits.

In accordance with some embodiments, data for transmission over a wideband channel is provided to transmitter 100 in the form of bit stream 101. Encoder 102 may apply forward error correcting (FEC) codes to bit stream 101 to generate coded bits comprising bit stream 103. Adaptive interleaver 104 may input a variable number of coded bits of bit stream 103 to an interleaver matrix of interleaver 104. In some embodiments, the variable number of coded bits may comprise one OFDM symbol and may comprise the number of coded bits per OFDM symbol (Ncbps). Adaptive interleaver 104 may add padding bits to the interleaver matrix to fill any remaining positions of the matrix, and may prune the padding bits after interleaving to provide sequence of interleaved bits 105 for subsequent modulation on a plurality of orthogonal subcarriers. System controller 118 may calculate the variable number of coded bits per OFDM symbol based on individual subcarrier modulation assignments 117 for the plurality of orthogonal subcarriers. Individual subcarrier modulation assignments 117 may be provided by subcarrier modulation assignor 116. The number of coded bits per OFDM symbol (Ncbps) 119 may be provided from system controller 118 to adaptive interleaver 104.

In some embodiments, the size of the interleaver matrix may be calculated prior to inputting the coded bits into the matrix. In these embodiments, system controller 118 may determine the size (e.g., the number of rows and columns) of the interleaver matrix based on number of coded bits per OFDM symbol 119 and the number of subchannels that comprise the wideband channel. In some embodiments, the interleaver matrix comprises a predetermined number of columns for each subchannel that comprises wideband channel. For example, in some embodiments, 16 columns may be utilized for each subchannel, although the scope of the invention is not limited in this respect. The number of rows may be calculated to allow number of coded bits per OFDM symbol 119 to fit into a matrix having the predetermined number of columns for each subchannel. Padding bits may be added because the number of coded bits per OFDM symbol (Ncbps) may not always be divisible by the number of columns.

In some embodiments, adaptive interleaver 104 may input the variable number coded bits into the interleaver matrix in a row-by-row fashion, may add the padding bits, and may perform an interleaving operation by reading bits from the interleaver matrix in a column-by-column fashion. In other embodiments, adaptive interleaver 104 may input the variable number coded bits into the interleaver matrix in a column-by-column fashion, may add the padding bits, and may perform an interleaving operation by reading bits from the interleaver matrix in a row-by-row fashion. Although some embodiments are described as using a matrix for interleaving, this is not a requirement, as other data structures and methods of permuting bits may also be used.

In some embodiments, pruning may comprise removing the padding bits when reading the bits from the matrix to provide sequence of interleaved bits 105 for subsequent subcarrier modulation. In other embodiments, interleaving may comprise reading the bits including the padding bits from the interleaver matrix, and pruning may comprise removing the padding bits after reading to provide sequence of interleaved bits 105 for subsequent subcarrier modulation.

In some embodiments, transmitter 100 also comprises serial-to-parallel converter 106 to convert sequence of interleaved bits 105 (i.e., comprising an OFDM symbol) from a serial form to parallel bits 107. In some embodiments, serial-to-parallel converter 106 may provide separate groups of parallel bits for each subcarrier to subcarrier modulator 108 based on subcarrier modulation assignments 117. Subcarrier modulator 108 may modulate parallel bits 107 in accordance with subcarrier modulation assignments 117 to generate symbol-modulated subcarriers 109 for transmission. Serial-to-parallel converter 106 may provide the proper number of bits for modulation on each subcarrier based on modulation assignments 117. Symbol-modulated subcarriers 109 may form a frequency domain representation of the OFDM symbol. In some of these embodiments, subcarrier modulator 108 may comprise a plurality of individual subcarrier modulators to separately modulate the individual subcarriers.

In other embodiments, a single subcarrier modulator may be used. In these embodiments, the subcarrier modulator may receive sequence of interleaved bits 105 from interleaver 104 and may modulate the bits (in serial groups) for each subcarrier in accordance with subcarrier modulation assignments 117. The subcarrier modulator may provide symbol-modulated subcarriers to a serial-to-parallel converter which converts the serial symbol-modulated subcarriers into parallel symbol-modulated subcarriers 109.

Inverse Fast Fourier transform (IFFT) circuitry 110 may perform an IFFT on symbol-modulated subcarriers 109 to generate a time domain representation of the OFDM symbol. Almost any form of inverse discrete Fourier transform (IDFT) may be used to perform the inverse transform operation. The number of time domain samples generated by IFFT circuitry 110 may be equal to the number of frequency components input thereto.

IFFT circuitry 110 may also convert the time domain samples generated by the IFFT operation, which may be in a parallel form, to one or more serial symbol streams 111 representing the OFDM symbol. IFFT circuitry 110 may also add a cyclic extension (or guard interval) to reduce inter-symbol interference in the channel. In some embodiments, the number of serial symbol streams 111 generated by IFFT circuitry may correspond to the number of subchannels, although the scope of the invention is not limited in this respect. Radio frequency (RF) circuitry 112 may prepare serial symbol streams 111 representing the OFDM symbol for transmission by one or more antennas 114. In some embodiments, RF circuitry 112 may convert serial symbol streams 111 into RF signals for transmission over the wideband channel. Antennas 114 may comprise one or more directional or omnidirectional antennas, including, for example, dipole antennas, monopole antennas, loop antennas, microstrip antennas or other type of antenna suitable for transmission of RF signals by transmitter 100.

In some embodiments, subcarrier modulation assignments 117 may be based on channel conditions, such as a signal to interference and noise ratio (SINR) for the particular subcarrier. In some embodiments, subcarrier modulation assignments 117 may be provided by a receiving station, although the scope of the invention is not limited in this respect. In these embodiments, higher modulation assignments (e.g., more bits per symbol) may be used for subcarriers having better SINRs.

In some embodiments when the number of coded bits per symbol is equal to the interleaver size, the interleaving process that adaptive interleaver 104 may perform may result in a permutation pattern that may be obtained from the following expression:

$$i = (R)(k \bmod C) + \mathrm{floor}(k/C) \; k = 0, 1, \ldots, NI-1,$$

where index k is the coded bit position before interleaving, index i defines the bit position after permutation, R is the number or rows in the interleaver matrix, C is the number of columns in the interleaver matrix, and NI is the interleaver size, such that $NI = R \times C$. This interleaving process may help assure that two adjacent bits before interleaving are separated by at least R bits after interleaving.

When a single subchannel (e.g., a 20 MHz channel) is used by transmitter 100 and when the number of coded bits per symbol is not equal to the interleaver size, adaptive interleaver 104 may permute coded bits of stream 103 as follows. Interleaver 104 may interleave the coded data bits having a block size corresponding to the number of coded bits per OFDM symbol (Ncbps). The permutation may include determining a size for the interleaver matrix, adding padding bits, inputting the coded bits including the padding bits to the interleaver matrix, and outputting the bits from the matrix with a pruning operation. The number of rows (R) of interleaver matrix may be determined from the number of columns (C) (e.g., C=16 for a 20 MHz subchannel) and the number of coded bits per OFDM symbol (i.e., Ncbps).

The interleaver matrix size (NI) may be determined such that difference between interleaver size and number of coded bits per OFDM symbol may be the minimal number. The number of rows of the matrix may be determined based on R=ceil(Ncbps/C). The columns of matrix may be numbered 0, ..., C−1 from left to right, and the rows of matrix may be numbered 0, ..., R−1 from up to down. NI-Ncbps padding bits may be added to the end of the Ncbps bits of sequence 103, and the sequence may be inputted to the matrix, for example, in a row-by-row fashion. The bits may be read from the matrix, for example in a column-by-column fashion from column 0 to column C−1. The output may be pruned by deleting the padding bits. The total number of pruned bits may be NI-Ncbps.

In some embodiments, when more than one subchannel (e.g., a 40 MHz wideband channel, a 60 MHz wideband channel, an 80 MHz wideband channel, etc.) comprising a wideband channel is used by transmitter 100, adaptive interleaver 104 may permute coded bits of stream 103 in accordance with a "short" interleaving scheme in which bits for a particular subchannel may be permuted together. In these embodiments, the permutation procedure may be based on an intra-subchannel permutation of the coded bits. The number of coded bits per OFDM symbol (Ncbps) may be divided into groups of bits with a length equaling a number of coded bits per subchannel. The number of groups may equal the number of subchannels. A group may include bits corresponding to a particular subchannel. In these embodiments, bit grouping and permutation may be performed independently for each group of bits based on interleaving scheme described above for a single subchannel which uses individual modulation assignments per subcarrier or different code rates.

In other embodiments, when more than one subchannel (e.g., a 40 MHz wideband channel, a 60 MHz wideband channel, an 80 MHz wideband channel, etc.) comprising a wideband channel is used by transmitter 100, adaptive interleaver 104 may permute coded bits 103 in accordance with a "long" interleaving scheme. In these embodiments, all coded bits of an OFDM symbol may be permuted together. In these embodiments, the interleaver size depends on channel bandwidth. The number of columns of the interleaver matrix may correspond to the channel bandwidth. In these embodiments, a predetermined number of columns (e.g., 16) may be used for each subchannel for calculating the total number of columns of the interleaver matrix. The number of rows (R) of interleaver matrix may be determined from the number of columns (C) and the number of coded bits per OFDM symbol (Ncbps) may be permuted in accordance with the interleaving operations described above.

Figure 2:
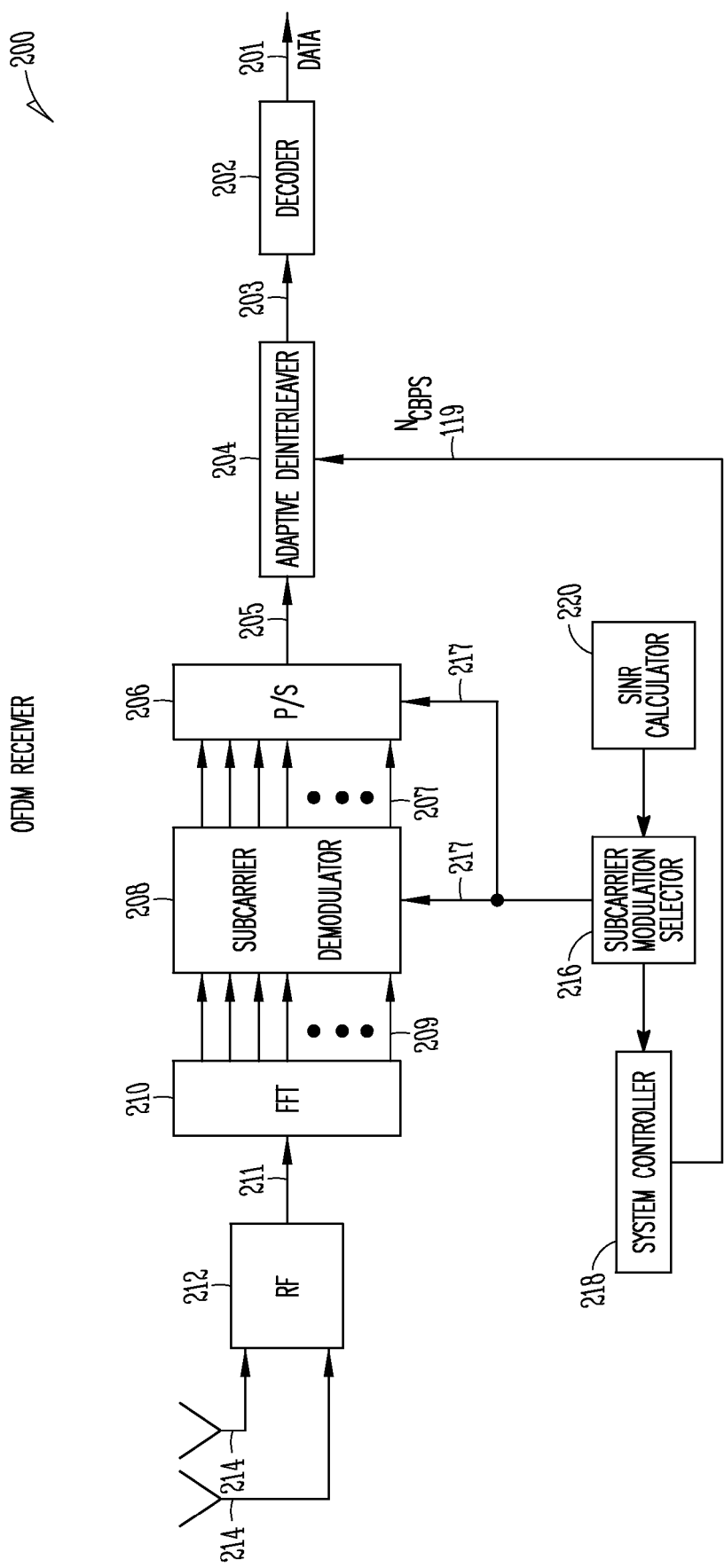
FIG. 2 is a block diagram of a receiver in accordance with some embodiments of the present invention.

FIG. 2 is a block diagram of a receiver in accordance with some embodiments of the present invention. Receiver 200 may be part of a wireless communication device, and may receive OFDM communication signals over a wideband communication channel that has been transmitted in accordance with an adaptive bit loading (ABL) scheme. Furthermore, receiver 200 may receive signals that may have had an adaptive interleaving operation performed by a transmitter, such as transmitter 100 (FIG. 1) although other transmitters may also be suitable. Some examples of suitable interleaving schemes are described above.

In accordance with some embodiments, receiver 200 comprises adaptive deinterleaver 204 to receive a variable number of coded bits of bit stream 105 comprising an OFDM symbol received over a wideband channel. The wideband channel may comprise one or more subchannels having a plurality of orthogonal subcarriers, and the orthogonal subcarriers may have been modulated in accordance with individual subcarrier modulation assignments 217. Adaptive deinterleaver 204 may insert padding bits to locations within sequence 205 to generate a block of bits. The locations for inserting the padding bits may be calculated based on the number of coded bits per OFDM symbol (Ncbps), and a number of columns of the deinterleaver matrix. Adaptive deinterleaver 204 may input the block of bits to the deinterleaver matrix filling the matrix and may perform a permutation (e.g., a deinterleaving operation). After permutation, adaptive deinterleaver 204 may prune the padding bits to provide sequence of deinterleaved bits 203 for decoder 202.

One or more antennas 214 may receive RF communication signals from a wideband channel, which may be converted to data signals 211 by RF circuitry 212. Data signals 211 may be a serial symbol stream representing an OFDM symbol. Circuitry 212 may include synchronization circuitry to synchronize the signal in a manner that allows individual OFDM symbols to be recognized and the cyclic extensions to be discarded. Fast Fourier transform (FFT) circuitry 210 may convert an OFDM symbol in a serial format into a parallel group of time domain samples. A FFT may be performed to generate frequency domain symbol-modulated subcarriers 209.

Subcarrier demodulator 208 may demodulate symbol-modulated subcarriers 209 to produce symbols 207 (e.g., log likelihood ratios for bits) in accordance with subcarrier modulation assignments 217 which may be provided by subcarrier modulation selector 216. In some embodiments, the subcarrier modulation assignments may be selected by receiver 200 and provided to a transmitting station, such as transmitter 100 (FIG. 1). In some embodiments, receiver 200 may have selected the modulation assignments based on channel conditions, such as background noise, in-band interference and/or channel response. In some embodiments, signal to interference and noise ratio (SINR) calculator 220 may determine the SINR for each subcarrier of a wideband channel and provide the SINR estimates to subcarrier modulation selector 216.

Parallel to serial converter 206 converts symbols 207 from a parallel form to serial stream 205 based subcarrier modulation assignments 217. Adaptive deinterleaver 204 may perform a deinterleaving operation on a variable number of bits per OFDM symbol of serial stream 205 in accordance with the operations described herein, and decoder 202 may decode deinterleaved serial stream 203 in accordance with a forward error correcting code used by the transmitter. Decoded serial bit stream 201 may be provided to a data processor for subsequent use.

In some embodiments, SINR calculator 220 may calculate one or more parameters for use by subcarrier modulation selector 216 in selecting modulation assignments 217. For example, SINR calculator 220 may use the channel estimate and interference measurements to calculate a SINR for each subcarrier frequency of a wideband channel. In other embodiments, SINR calculator 220 may calculate other parameters based on background noise, in-band interference and/or channel effects for one or more subcarriers. The parameters may be used by subcarrier modulation selector 216 and subcarrier modulation assignor 116 (FIG. 1) to select modulation assignments for one or more of the subcarriers.

In some embodiments, transmitter 100 (FIG. 1) and/or receiver 200 may transmit and/or receive RF communications in accordance with specific communication standards, such as the IEEE 802.11(a), 802.11(b), 802.11(g/h) and/or 802.16 standards for wireless local area network (WLAN) communications, although transmitter 100 (FIG. 1) and/or receiver 200 may also be suitable to transmit and/or receive communications in accordance with other techniques. In some embodiments, the RF signals may comprise OFDM signals comprising a plurality of symbol-modulated subcarriers in either a 5 GHz frequency spectrum or a 2.4 GHz frequency spectrum.

In some embodiments, transmitter 100 (FIG. 1) and/or receiver 200 may be part of a wireless communication device. The wireless communication device may be a personal digital assistant (PDA), a laptop or portable computer with wireless communication capability, a web tablet, a wireless telephone, a wireless headset, a pager, an instant messaging device, an MP3 player, a digital camera, an access point or other device that may receive and/or transmit information wirelessly.

Although transmitter 100 (FIG. 1) and receiver 200 are described as part of a wireless communication device, transmitter 100 (FIG. 1) and receiver 200 may comprise almost any wireless or wireline communication device, including a general purpose processing or computing system. Although transmitter 100 (FIG. 1) and receiver 200 are illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein.

Figure 3:
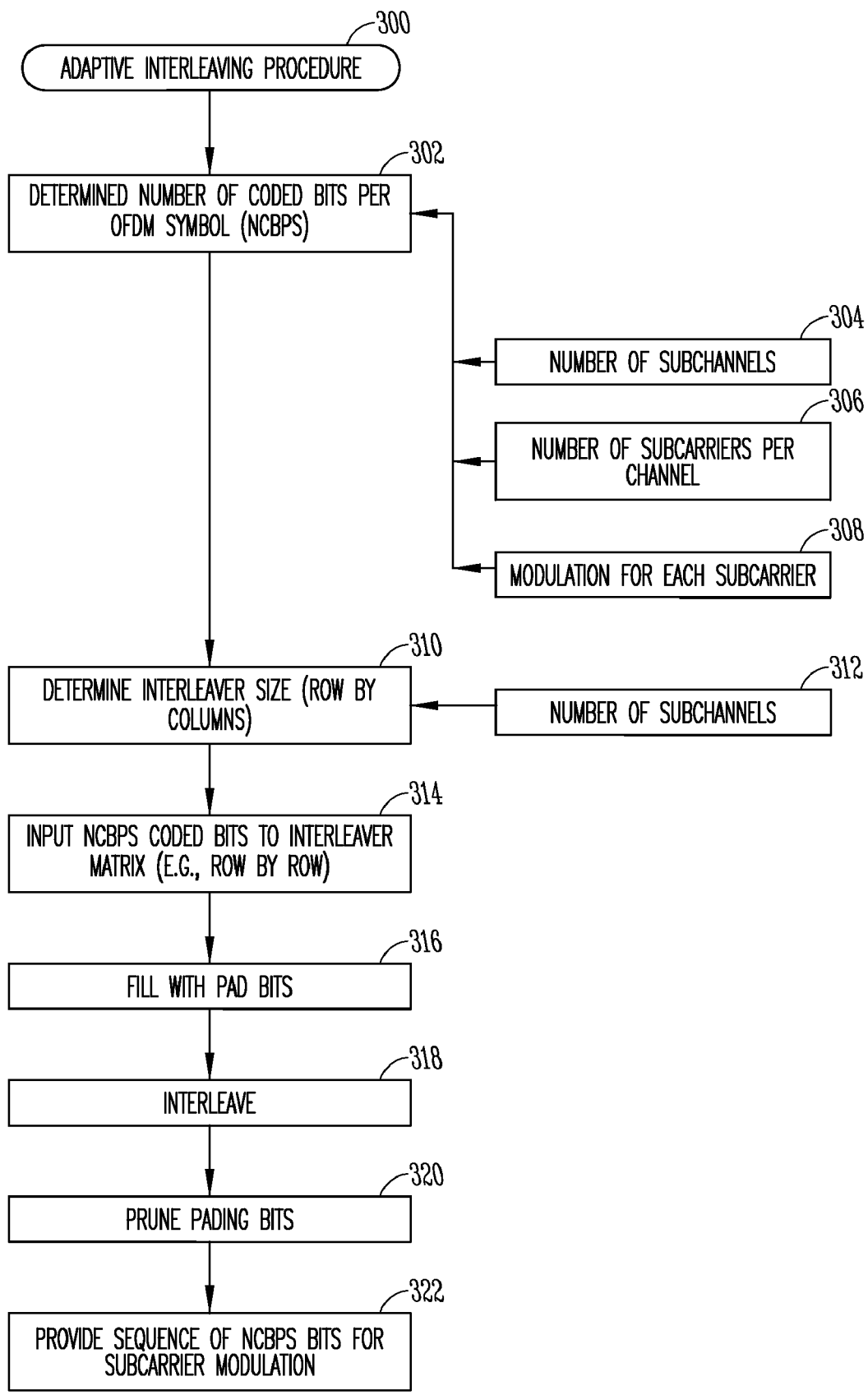
FIG. 3 is a flow chart of an adaptive interleaving procedure in accordance with some embodiments of the present invention.

FIG. 3 is a flow chart of an adaptive interleaving procedure in accordance with some embodiments of the present invention. Adaptive interleaving procedure 300 may be performed by a transmitter, such as transmitter 100 (FIG. 1) to interleave a variable number of coded bits per OFDM symbol.

Operation 302 determines the number of coded bits per OFDM symbol (Ncbps). The number may depend on modulation assignments 308 for the subcarriers, number of subcarriers 306 and number of subchannels 304 that may comprise a wideband channel.

Operation 310 determines the interleaver size. In some embodiments, an interleaver matrix may have a predetermined number of columns for each subchannel 312 of the wideband channel, and the number of coded bits per OFDM symbol may be used to determine number of rows.

Operation 314 may input the number of coded bits per OFDM symbol into the interleaver matrix, and operation 316 may fill the remaining entries of the matrix with padding bits. In some embodiments, operations 314 and 316 may be performed as one operation. In some embodiments, the number of coded bits per OFDM symbol may be input to the interleaver matrix in a row-by-row fashion, although the scope of the invention is not limited in this respect.

Operation 318 may perform an interleaving operation, such as outputting the bits from the matrix to generate a sequence interleaved bits. In some embodiments, the bits may be read from the interleaver matrix in a column-by-column fashion, although the scope of the invention is not limited in this respect.

Operation 320 prunes the padding bits. In some embodiments, the padding bits may be removed from the sequence of interleaved bits to generate a sequence of Ncbps bits corresponding to the number of bits per OFDM symbol of sequence 105 (FIG. 1). On other embodiments, the padding bits may be removed when operation 318 is performed to generate the sequence of Ncbps bits corresponding to sequence 105 (FIG. 1).

Operation 322 provides the Ncbps bits for subsequent modulation on the plurality of subcarriers in accordance with the individual subcarrier modulation orders.

In some embodiments, operation 302 may be performed by a system controller, such as system controller 118 (FIG. 1), and operations 310 through 322 may be performed by adaptive interleaver 104 (FIG. 1), although the scope of the invention is not limited in this respect.

In some embodiments, interleaving may be performed on a per subchannel basis. In these embodiments, an interleaver size may be determined separately for each subchannel based on the individual modulation assignments of the subcarriers of the subchannel. In some embodiments, the number of bits per OFDM symbol may be divided by the number of subchannels for separate interleaving operations. In these embodiments, operations 310 through 320 may be performed for each subchannel, and operation 322 may provide bits for subcarrier modulation on the separate subchannels.

Figure 4:
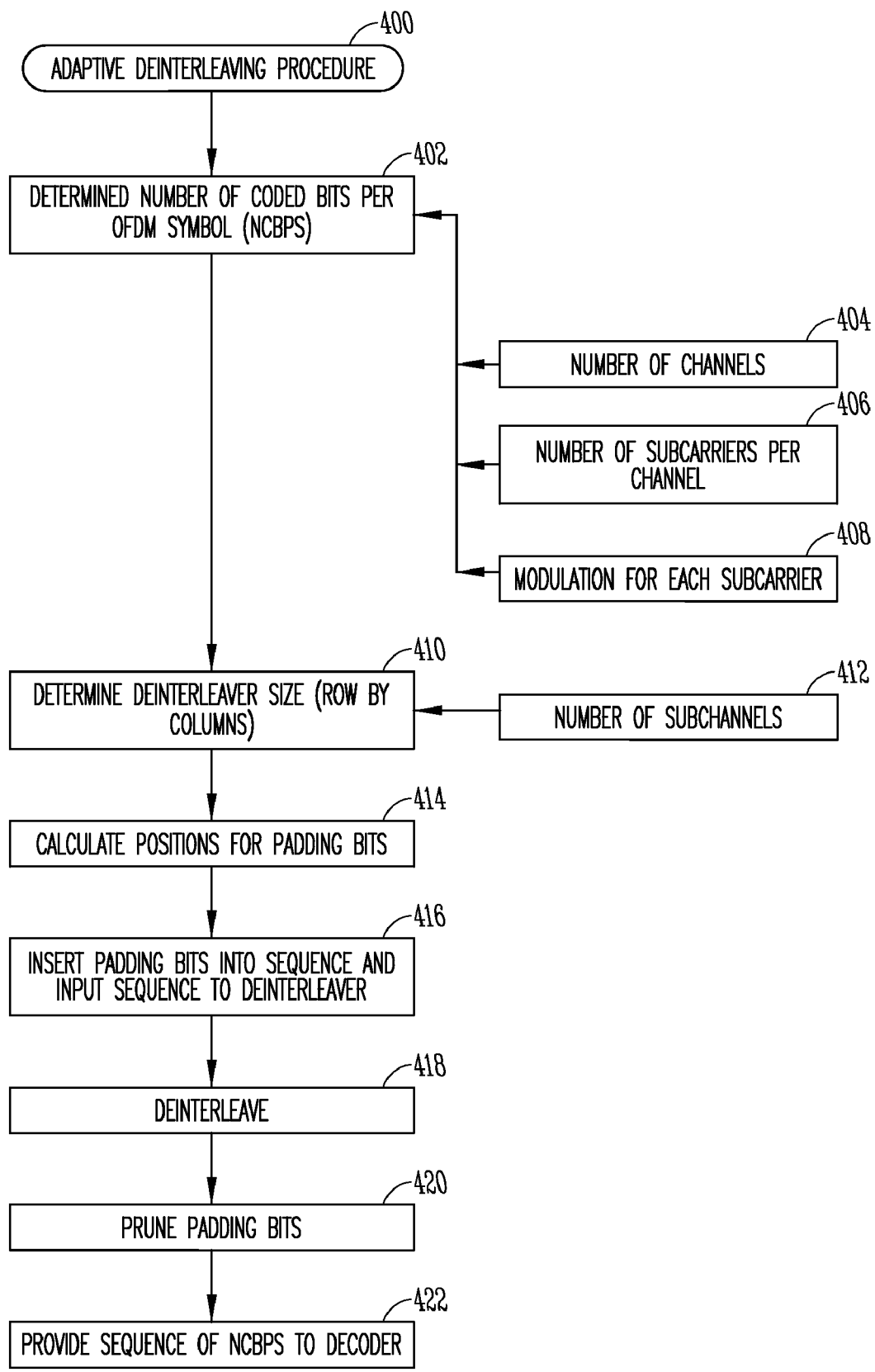
FIG. 4 is a flow chart of an adaptive deinterleaving procedure in accordance with some embodiments of the present invention.

FIG. 4 is a flow chart of an adaptive deinterleaving procedure in accordance with some embodiments of the present invention. Adaptive deinterleaving procedure 400 may be performed by a receiver, such as receiver 200 (FIG. 2) to deinterleave a variable number of coded bits per OFDM symbol, although other receivers may also be suitable.

Operation 402 determines the number of coded bits per OFDM symbol (Ncbps). The number may depend on modulation assignments 408 for the subcarriers, number of subcarriers 406 and number of subchannels 404 that may comprise a wideband channel.

Operation 410 determines the deinterleaver size. In some embodiments, a deinterleaver matrix may have a predetermined number of columns for each subchannel 412 of the wideband channel, and the number of coded bits per OFDM symbol may be used to determine number of rows.

Operation 414 may calculate positions for adding padding bits. The positions may be calculated based on the number of rows of the deinterleaver matrix, and the difference between the interleaver size and Ncbps. Operation 416 inserts the padding bits to the calculated locations within a bit stream, such as bit stream 205 (FIG. 2), of bits that comprise an OFDM symbol. When the deinterleaver matrix comprises R rows, a padding bit may be added to the end of the sequence, and at every Rth position from the end of the sequence until the number of padding bits is equal to the difference between the calculated deinterleaver size and the number of coded bits per OFDM symbol.

Operation 416 may also input the sequence, including the padding bits, to the deinterleaver matrix. In some embodiments, operation 416 may input the padding bits to the matrix in a column-by-column fashion, although the scope of the invention is not limited in this respect.

Operation 418 may perform a deinterleaving operation, such as outputting the bits from the matrix to generate a sequence of deinterleaved bits, such as sequence 203 (FIG. 2). In some embodiments, the bits may be read from the deinterleaver matrix in a row-by-row fashion, although the scope of the invention is not limited in this respect.

Operation 420 may prune the padding bits. In some embodiments, operation 418 may result in the padding bits being together at the end of the sequence. In these embodiments, operation 420 may remove these padding bits. The number of padding bits may be the difference between the interleaver size and Ncbps.

Operation 422 provides the sequence of deinterleaved bits to a decoder, such as decoder 202 (FIG. 2), although the scope of the invention is not limited in this respect.

In some embodiments, operation 402 may be performed by a system controller, such as system controller 218 (FIG. 2), and operations 410 through 422 may be performed by adaptive deinterleaver 204 (FIG. 2).

In some embodiments, deinterleaving may be performed on a per subchannel basis. In these embodiments, the deinterleaver size may be determined separately for each subchannel based on the individual modulation assignments of the subcarriers of the subchannel. In some embodiments, the number of bits per OFDM symbol may be divided by the number of subchannels for separate per subchannel deinterleaving operations. In these embodiments, operations 410 through 420 may be performed for each subchannel, and operation 422 may provide a combined sequence of bits from all subchannels for decoding.

Although the individual operations of procedures 300 (FIG. 3) and 400 are illustrated and described as separate operations, one or more of the individual operations may be performed concurrently and nothing requires that the operations be performed in the order illustrated.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, computing device includes one or more processing elements coupled with computer readable memory that may be volatile or non-volatile memory or a combination thereof.

Embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any mechanism for storing in a form readable by a machine (e.g., a computer). For example, a computer-readable storage medium may include read-only memory (ROM), random-access memory (RAM), magnetic disk storage media, optical storage media, flash-memory devices, and other storage devices and media.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, inventive subject matter lies in less than all features of a single disclosed embodiment. Thus the following claims are hereby incorporated into the detailed description, with each claim standing on its own as a separate preferred embodiment.

What is claimed is:

1. A method performed by a transmitter for orthogonal frequency division multiplexed (OFDM) communications, the method comprising:
   selecting a size for an interleaver matrix based on a variable number of coded bits and a plurality of orthogonal subcarriers used for transmitting an OFDM symbol;
   inputting the variable number of coded bits into the interleaver matrix;
   adding padding bits to the interleaver matrix to fill any remaining positions;
   after performing an interleaving operation, pruning the padding bits to provide a sequence of interleaved bits for subsequent modulation on the subcarriers; and
   transmitting the OFDM symbol on the subcarriers with more than one antenna, wherein the variable number of coded bits is based on individual subcarrier modulation assignments.

2. The method of claim 1 wherein the OFDM symbol comprises the variable number of coded bits.

3. The method of claim 2 wherein the transmitter is configured to communicate in accordance with an IEEE 802.16 standard.

4. The method of claim 2 further comprising modulating the sequence of interleaved bits on the subcarriers in accordance with the individual subcarrier modulation assignments,
   wherein the variable number of coded bits is determined based on a number of subcarriers and a number of bits associated with the individual subcarrier modulation assignments.

5. The method of claim 4 wherein the subcarrier modulation assignments are based on channel conditions associated with the individual subcarriers, the channel conditions including a signal to interference and noise ratio (SINR).

6. The method of claim 5 wherein inputting comprises inputting the variable number of coded bits into the interleaver matrix in a row-by-row fashion, and wherein the method further comprises reading bits including the padding bits from the interleaver matrix in a column-by-column fashion as part of the interleaving operation, and wherein pruning comprises removing the padding bits after the reading to provide the sequence of interleaved bits for subsequent subcarrier modulation.

7. The method of claim 6 wherein the individual subcarrier modulation assignments comprise assignments ranging from zero to ten bits per symbol.

8. A multi-antenna transmitter for orthogonal frequency division multiplexed (OFDM) communications comprising:

a processor to select a size of for interleaver matrix based on a variable number of coded bits and a plurality of orthogonal subcarriers used for transmitting an OFDM symbol;

an adaptive bit interleaver to input the variable number of coded bits into the interleaver matrix, to add padding bits to the interleaver matrix to fill any remaining positions, and to prune the padding bits after performing an interleaving operation to provide a sequence of interleaved bits for subsequent modulation on the subcarriers; and OFDM transmitter circuitry to transmit the OFDM symbol on the subcarriers with more than one antenna, wherein the variable number of coded bits is based on individual subcarrier modulation assignments.

9. The transmitter of claim 8 wherein the OFDM symbol comprises the variable number of coded bits.

10. The transmitter of claim 9 wherein the OFDM transmitter circuitry is configured to communicate in accordance with an IEEE 802.16 standard.

11. The transmitter of claim 9 further comprising a modulator to modulate the sequence of interleaved bits on the subcarriers in accordance with the individual subcarrier modulation assignments, wherein the variable number of coded bits is determined based on a number of subcarriers and a number of bits associated with the individual subcarrier modulation assignments.

12. The transmitter of claim 11 wherein the subcarrier modulation assignments are based on channel conditions associated with the individual subcarriers, the channel conditions including a signal to interference and noise ratio (SINR).

13. The transmitter of claim 12 wherein the interleaver is configured to input the variable number of coded bits into the interleaver matrix in a row-by-row fashion, and to read bits including the padding bits from the interleaver matrix in a column-by-column fashion as part of the interleaving operation, and wherein the interleaver is configured to prune the padding bits by removing the padding bits after the reading to provide the sequence of interleaved bits for subsequent subcarrier modulation.

14. The transmitter of claim 13 wherein the individual subcarrier modulation assignments comprise assignments ranging from zero to ten bits per symbol.

15. An adaptive bit interleaver for an orthogonal frequency division multiplexed (OFDM) transmitter, the adaptive bit interleaver configured to:

input a variable number of coded bits into an interleaver matrix, a size for the interleaver matrix being selected based on a variable number of coded bits and a plurality of orthogonal subcarriers used for transmitting an OFDM symbol;

add padding bits to the interleaver matrix to fill any remaining positions; and prune the padding bits after performing an interleaving operation to provide a sequence of interleaved bits for subsequent modulation on the subcarriers, wherein the variable number of coded bits is based on individual subcarrier modulation assignments.

16. The adaptive bit interleaver of claim 15 wherein the OFDM transmitter is configured to transmit the OFDM symbol on the subcarriers with more than one antenna, and wherein the OFDM symbol comprises the variable number of coded bits.

17. The adaptive bit interleaver of claim 16 wherein the OFDM transmitter is configured to transmit the OFDM symbol in accordance with an IEEE 802.16 standard.

18. The adaptive bit interleaver of claim 16 wherein the subcarrier modulation assignments are based on channel conditions associated with the individual subcarriers, the channel conditions including a signal to interference and noise ratio (SINR).

19. The adaptive bit interleaver of claim 18 wherein the adaptive bit interleaver is further configured to input the variable number of coded bits into the interleaver matrix in a row-by-row fashion, and to read bits including the padding bits from the interleaver matrix in a column-by-column fashion as part of the interleaving operation, and wherein the interleaver is configured to prune the padding bits by removing the padding bits after the reading to provide the sequence of interleaved bits for subsequent subcarrier modulation.

20. The adaptive bit interleaver of claim 19 wherein the individual subcarrier modulation assignments comprise assignments ranging from zero to ten bits per symbol.

* * * * *

UNITED STATES PATENT AND TRADEMARK OFFICE
CERTIFICATE OF CORRECTION

PATENT NO. : 8,218,674 B2
APPLICATION NO. : 12/492466
DATED : July 10, 2012
INVENTOR(S) : Maltsev et al.

Page 1 of 1

It is certified that error appears in the above-identified patent and that said Letters Patent is hereby corrected as shown below:

In column 2, line 15, after "93137177" insert --,--, therefor

In column 2, line 15, delete "dated" and insert --mailed--, therefor

In column 2, line 17, after "93137177" insert --,--, therefor

In column 2, line 19, delete "high" and insert --High--, therefor

In column 2, line 19, delete "air" and insert --Air--, therefor

In column 2, line 22, delete "Lan" and insert --LAN--, therefor

In column 10, line 49, in claim 1, before "wherein" insert --¶--, therefor

Signed and Sealed this
Eleventh Day of September, 2012

David J. Kappos
*Director of the United States Patent and Trademark Office*